United States Patent
Luong et al.

(10) Patent No.: US 9,689,346 B2
(45) Date of Patent: Jun. 27, 2017

(54) GAS TURBINE ENGINE CONVERGENT/DIVERGENT EXHAUST NOZZLE DIVERGENT SEAL WITH DOVETAIL INTERFACE

(71) Applicant: United Technologies Corporation, Hartford, CT (US)

(72) Inventors: Truc Luong, Boston, MA (US); Keegan M. Martin, Stafford Springs, CT (US)

(73) Assignee: United Technologies Corporation, Farmington, CT (US)

( * ) Notice: Subject to any disclaimer, the term of this patent is extended or adjusted under 35 U.S.C. 154(b) by 385 days.

(21) Appl. No.: 14/249,774

(22) Filed: Apr. 10, 2014

(65) Prior Publication Data

US 2015/0292437 A1 Oct. 15, 2015

Related U.S. Application Data

(60) Provisional application No. 61/811,522, filed on Apr. 12, 2013, provisional application No. 61/811,544, filed on Apr. 12, 2013, provisional application No. 61/811,551, filed on Apr. 12, 2013.

(51) Int. Cl.
| | |
|---|---|
| *F02K 1/00* | (2006.01) |
| *B05B 12/00* | (2006.01) |
| *F02K 1/80* | (2006.01) |
| *F02K 1/12* | (2006.01) |

(52) U.S. Cl.
CPC ............ *F02K 1/805* (2013.01); *F02K 1/1223* (2013.01)

(58) Field of Classification Search
CPC .......... F02K 1/12; F02K 1/805; F02K 1/1223; F05D 2230/60
USPC ........................ 60/232, 770, 771; 29/889.22; 239/265.19, 265.33, 265.37, 265.39
See application file for complete search history.

(56) References Cited

U.S. PATENT DOCUMENTS

| | | | | |
|---|---|---|---|---|
| 5,000,386 A | * | 3/1991 | Lybarger | F02K 1/12 239/265.39 |
| 5,680,755 A | * | 10/1997 | Hauer | F02K 1/008 239/265.35 |
| 5,775,589 A | * | 7/1998 | Vdoviak | F02K 1/12 239/127.1 |
| 5,794,850 A | | 8/1998 | Gutierrez | |
| 5,813,611 A | | 9/1998 | Cires et al. | |
| 5,839,663 A | | 11/1998 | Broadway et al. | |
| 6,398,129 B1 | | 6/2002 | Johnson | |
| 7,555,904 B1 | | 7/2009 | Osga et al. | |
| 7,617,685 B2 | | 11/2009 | Norman et al. | |
| 7,685,825 B2 | | 3/2010 | Senofonte et al. | |
| 7,770,399 B2 | | 8/2010 | Burdick et al. | |
| 8,205,454 B2 | * | 6/2012 | Cowan | F02K 1/1223 239/265.39 |
| 2003/0145599 A1 | * | 8/2003 | Renggli | F02K 1/12 60/771 |
| 2003/0145600 A1 | * | 8/2003 | Senile | F02K 1/12 60/771 |
| 2007/0186555 A1 | * | 8/2007 | Peters | F02K 1/12 60/770 |

(Continued)

*Primary Examiner* — Luan K Bui
(74) *Attorney, Agent, or Firm* — O'Shea Getz P.C.

(57) ABSTRACT

A divergent flap seal includes a flap seal body with a spine, the flap seal body manufactured of a non-metallic material. A mount is engaged with the spine at the dovetail interface and a resilient member at the dovetail interface.

13 Claims, 12 Drawing Sheets

(56) References Cited

U.S. PATENT DOCUMENTS

| | | | |
|---|---|---|---|
| 2009/0217671 A1* | 9/2009 | Senile | F02K 1/80 60/771 |
| 2009/0313998 A1 | 12/2009 | Senofonte et al. | |
| 2013/0081398 A1 | 4/2013 | Kramer | |
| 2013/0341426 A1* | 12/2013 | Barry, Jr. | F02K 1/002 239/265.19 |

* cited by examiner

GAS TURBINE ENGINE CONVERGENT/DIVERGENT EXHAUST NOZZLE DIVERGENT SEAL WITH DOVETAIL INTERFACE

This application claims priority to U.S. Patent Appln. No. 61/811,522 filed Apr. 12, 2013, U.S. Patent Appln. No. 61/811,544 filed Apr. 12, 2013 and U.S. Patent Appln. No. 61/811,551 filed Apr. 12, 2013.

BACKGROUND OF THE INVENTION

1. Technical Field

The present disclosure relates to a gas turbine engine and, more particularly, to a nozzle system therefor.

2. Background Information

Gas turbine engines, such as those which power modern military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, an augmentor section, or "afterburner", is operable to selectively increase thrust. The increase in thrust is produced when fuel is injected into the core exhaust gases downstream of the turbine section and burned with the oxygen contained therein to generate a second combustion and passed through a variable area exhaust nozzle system.

A variable area exhaust nozzle such as a convergent/divergent (C/D) nozzle optimizes the thrust produced within the gas turbine engine by provision of a multitude of nozzle positions. The term "convergent-divergent" describes an exhaust nozzle having a convergent section upstream of a divergent section. Exhaust gases from the turbine section pass through the decreasing diameter convergent section before passing through the increasing diameter divergent section. Convergent/Divergent (C/D) exhaust nozzles may be configured for an augmented or non-augmented engine in a two or three dimensional configuration with or without the capability to vector.

The nozzle defines a throat or jet area and an exit area. The jet area is the minimum cross sectional area of the nozzle and is defined by the interface between an aft end of the convergent section and a forward end of the divergent section. The exit area is the cross sectional area measured at the aft most section of the nozzle. The area ratio of a nozzle is the exit area divided by the jet area. The area ratio range provides a general indicator of engine performance and an increase in the area ratio range results in more efficient engine performance with increased engine thrust, fuel efficiency and a decrease in actuator loads required to articulate the nozzle as the engine power setting increases.

The convergent and divergent sections generally include circumferentially disposed flaps and flap seals. The alternately disposed flaps and flap seals accommodate changes injet area and nozzle axis skew (if the nozzle is vectorable).

SUMMARY

A divergent flap seal according to one disclosed non-limiting embodiment of the present disclosure includes a flap seal body with a spine, the flap seal body manufactured of a non-metallic material; a mount engaged with the spine at a dovetail interface; and a resilient member at the dovetail interface.

In a further embodiment of the present disclosure, the mount is manufactured of a metallic alloy.

In a further embodiment of any of the foregoing embodiments of the present disclosure, the flap seal body is manufactured of a monolithic ceramic material.

In a further embodiment of any of the foregoing embodiments of the present disclosure, the monolithic ceramic material is a SN240 monolithic ceramic.

In a further embodiment of any of the foregoing embodiments of the present disclosure, the resilient member is a leaf spring.

A divergent flap seal according to another disclosed non-limiting embodiment of the present disclosure includes a flap seal body with a spine, the flap seal body manufactured of a non-metallic material; a forward mount engaged with the spine at a forward dovetail interface; a first resilient member at the forward dovetail interface; an aft mount engaged with the spine at an aft dovetail interface; and a second resilient member at the aft dovetail interface.

In a further embodiment of any of the foregoing embodiments of the present disclosure, the first resilient member and the second resilient member are located between the spine and a tail of the respective forward mount and aft mount.

In a further embodiment of any of the foregoing embodiments of the present disclosure, the spine has a male dove tail geometry and the tail of the respective forward mount and aft mount has a female dove tail geometry to radially lock onto the dovetail spine.

In a further embodiment of any of the foregoing embodiments of the present disclosure, the spine forms a flared pin in cross-section.

In a further embodiment of any of the foregoing embodiments of the present disclosure, the first resilient member and the second resilient member is a leaf spring.

A further embodiment of any of the foregoing embodiments of the present disclosure includes a clamp plate mounted to the forward mount and the aft mount to sandwich the first resilient member and the second resilient member at least partially within the spine.

In a further embodiment of any of the foregoing embodiments of the present disclosure, the first resilient member and the second resilient member are at least partially within a forward dovetail socket and an aft dovetail socket in the spine.

In a further embodiment of any of the foregoing embodiments of the present disclosure, the first resilient member and the second resilient member is a leaf spring.

A method of mounting a divergent flap seal of a convergent/divergent nozzle system according to another disclosed non-limiting embodiment of the present disclosure includes preloading a mount manufactured of a metal alloy with respect to a flap seal body manufactured of a non-metallic material.

A further embodiment of any of the foregoing embodiments of the present disclosure includes attaching the mount to the flap seal body at a dovetail socket within a spine of the flap seal body.

A further embodiment of any of the foregoing embodiments of the present disclosure includes attaching the mount to the flap seal body at a spine of the flap seal body, the spine and mount defining a dovetail interface in cross section.

A further embodiment of any of the foregoing embodiments of the present disclosure includes clamping the mount to the spine without thru fasteners.

A convergent/divergent nozzle system according to another disclosed non-limiting embodiment of the present disclosure includes a convergent section and a divergent section. The divergent section is downstream of the convergent section. The divergent section includes a flap seal body manufactured of a non-metallic material.

A further embodiment of any of the foregoing embodiments of the present disclosure includes a forward mount manufactured of a metallic alloy, wherein the forward mount is attached to a spine of said flap seal body.

A further embodiment of any of the foregoing embodiments of the present disclosure includes a flap seal joint structure mounted to the forward mount.

A further embodiment of any of the foregoing embodiments of the present disclosure includes an aft mount manufactured of a metallic alloy, which aft mount is engaged with the spine.

A further embodiment of any of the foregoing embodiments of the present disclosure includes a flap seal position guide mounted to the forward mount and the aft mount.

A further embodiment of any of the foregoing embodiments of the present disclosure includes an axial stop mounted to the aft mount to axially interface with an end of the spine.

A method of mounting a divergent flap seal of a convergent/divergent nozzle system according to another disclosed non-limiting embodiment of the present disclosure includes the step of attaching a mount manufactured of a metal alloy to a flap seal body manufactured of a non-metallic material at a dovetail socket within a spine of the flap seal body.

A further embodiment of any of the foregoing embodiments of the present disclosure includes the step of clamping the metal alloy mount to the spine without thru fasteners.

A further embodiment of any of the foregoing embodiments of the present disclosure includes the step of sandwiching a tail of the mount within the spine.

A further embodiment of any of the foregoing embodiments of the present disclosure includes the step of sandwiching a tail of the mount within a dovetail socket of the spine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
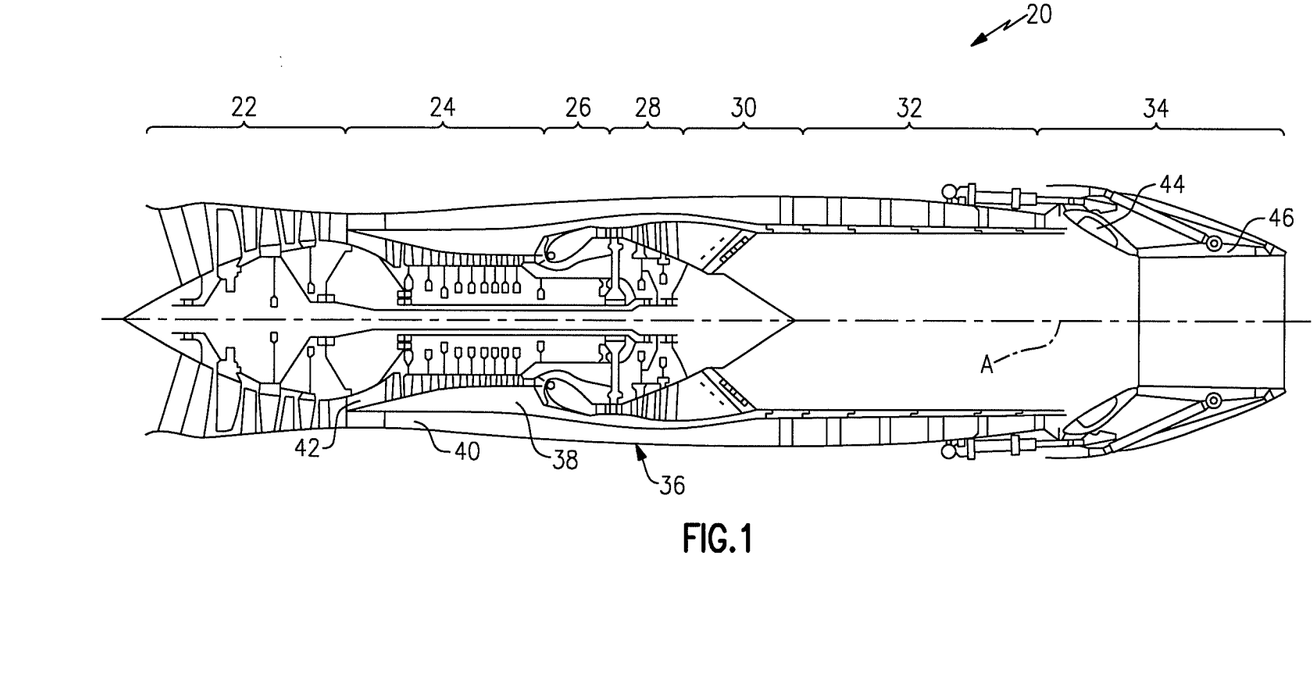
FIG. 1 is a general schematic view of an exemplary gas turbine engine with a nozzle section according to one disclosed non-limiting embodiment.

FIG. 1 schematically illustrates a gas turbine engine 20. The gas turbine engine 20 is disclosed herein as a two-spool low-bypass augmented turbofan that generally 10 incorporates a fan section 22, a compressor section 24, a combustor section 26, a turbine section 28, an augmenter section 30, an exhaust duct section 32, and a nozzle system 34 along a central longitudinal engine axis "A". Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle and other engine architectures with a nozzle system.

An outer structure 36 and an inner structure 38 define a generally annular secondary airflow path 40 around a core primary airflow path 42. Various structure and modules may define the outer structure 36 and the inner structure 38 which essentially define an exoskeleton to support the rotational hardware therein.

Air that enters the fan section 22 is divided between a core primary airflow through the core primary airflow path 42 and a secondary airflow through a secondary airflow path 40. The core primary airflow passes through the combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein is any airflow different from the core primary airflow. The secondary airflow may ultimately be at least partially injected into the core primary airflow path 42 adjacent to the exhaust duct section 32 and the nozzle system 34.

Figure 2:
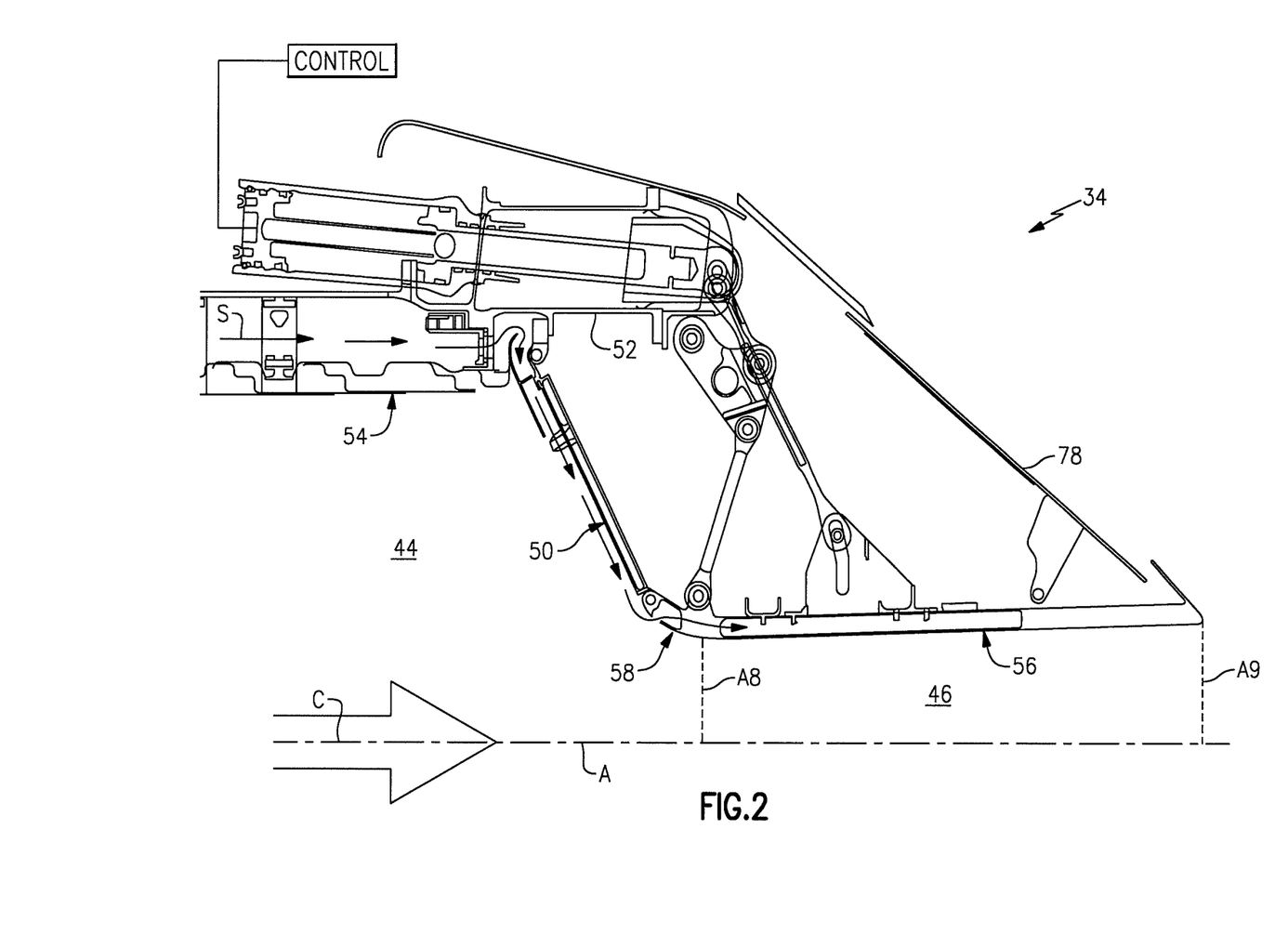
FIG. 2 is a lateral cross-section of a convergent divergent nozzle in a first Position.

With reference to FIG. 2, the exhaust duct section 32 may be circular in cross-section as typical of an axisymmetric augmented low bypass turbofan that terminates in a Convergent/Divergent (C/D) nozzle system 34. The Convergent/Divergent (C/D) nozzle system 34 generally includes a convergent section 44 and a divergent section 46. The convergent section 44 includes a multiple of circumferentially distributed convergent flaps 50 (only one 15 shown in section), each pivotably connected to a stationary frame 52 with a cooling liner panel 54 of the exhaust duct section 32 upstream thereof. The divergent section 46 includes a multiple of circumferentially distributed divergent flaps 56 (only one shown in section) pivotably connected at a joint 58 to an aft section of the convergent flaps 50.

Figure 3:
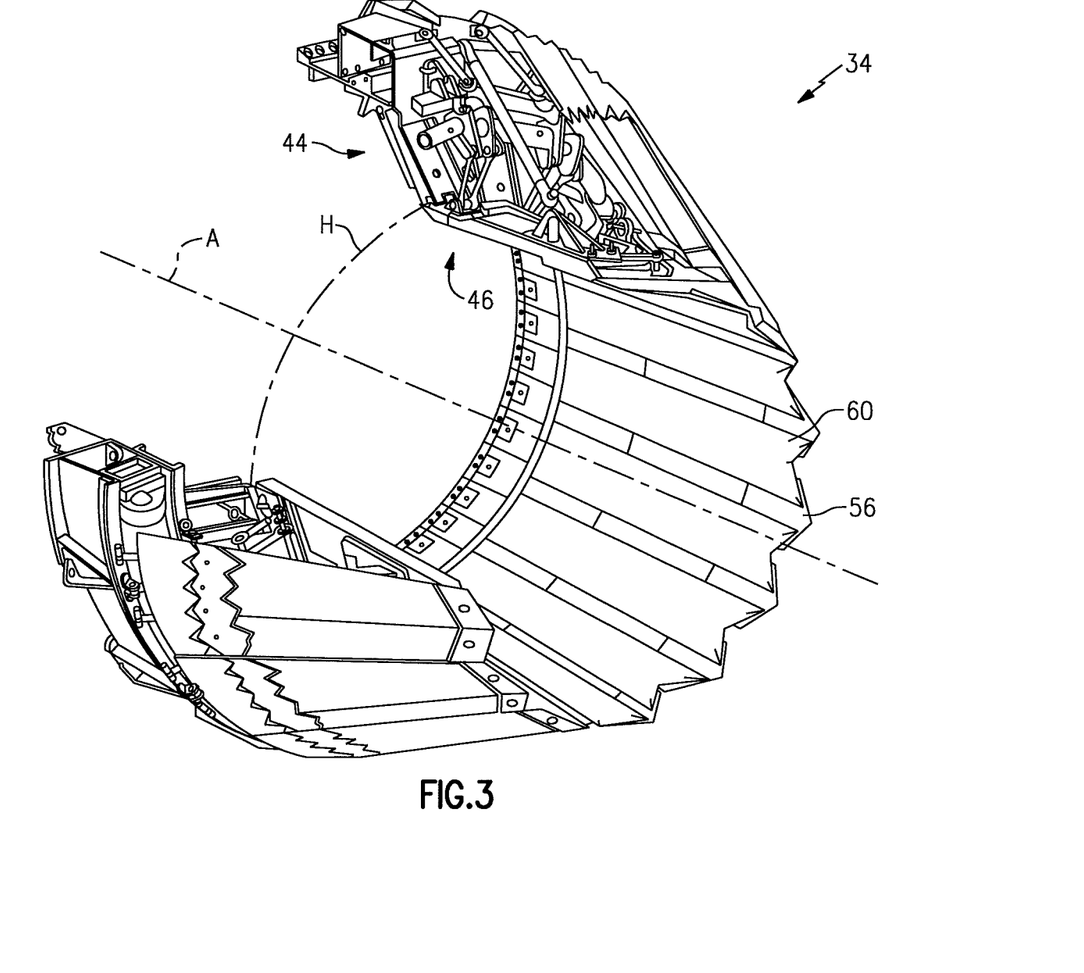
FIG. 3 is a perspective partial cross-section of the convergent divergent nozzle in the first position.
Figure 4:
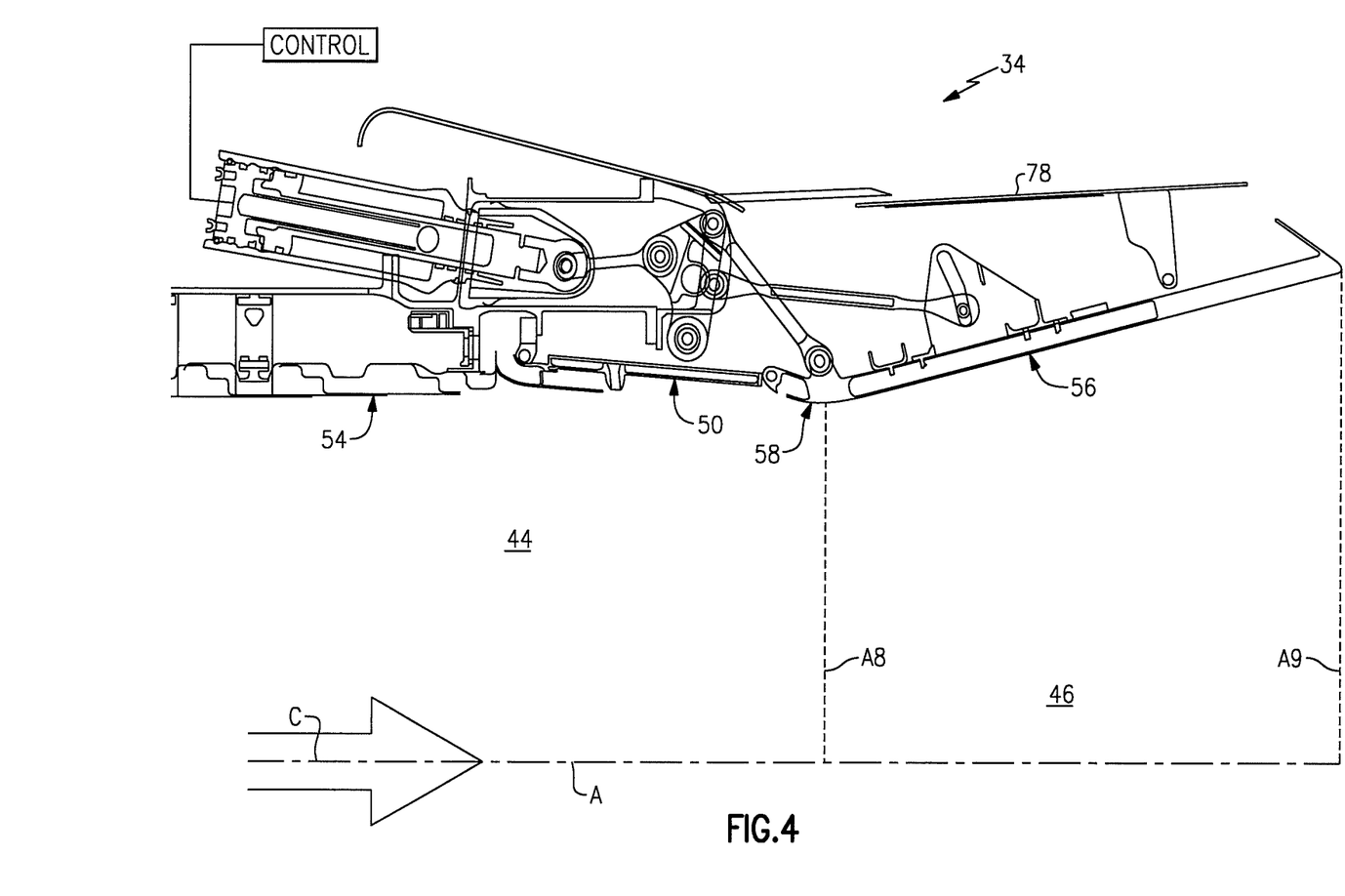
FIG. 4 is a lateral cross-section of a convergent divergent nozzle in a second Position.
Figure 5:
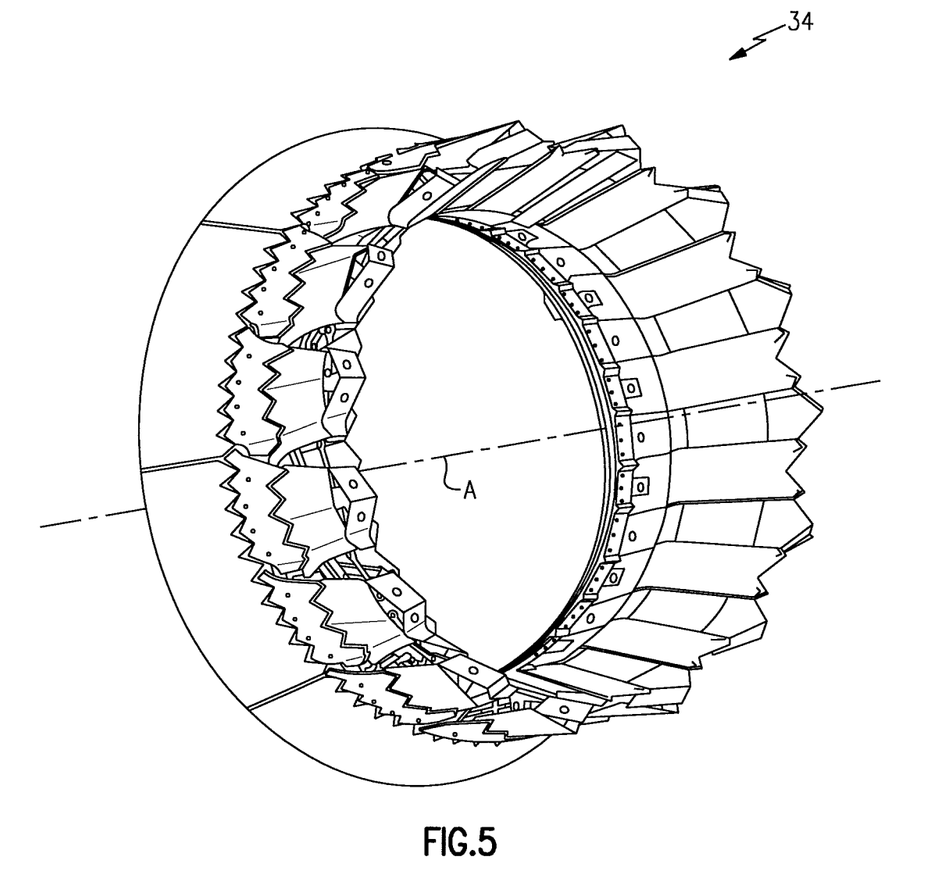
FIG. 5 is a perspective view of the convergent divergent nozzle in the second position.

A plurality of divergent flap seals 60 (FIG. 3) are distributed circumferentially between and to at least partially overlap the adjacent divergent flaps 56. Taken collectively, the convergent and divergent flaps and the flap seals circumscribe the nozzle centerline "A" to define a variable radial outer boundary for the core primary airflow. A control system (illustrated schematically) varies the angular orientations of the convergent flaps 50 and divergent flaps 56 to adjust a nozzle throat A8 and exit A9 about a nozzle centerline "A" between example minimum position (FIGS. 2 and 3) and a maximum position (FIGS. 4 and 5).

The liner panels 54, taken collectively, form a liner that cooperates with the convergent flaps 50 to define an annular cooling airflow passageway that guides the secondary airflow (illustrated schematically be arrows S) along an annular inner surface of the convergent flaps 50 and at least partially into the divergent flaps 56. The secondary airflow "S" is typically sourced from the fan section 22, the compressor section 24, a third stream airflow, ambient airflow and/or other airflow that is different from the core primary airflow (illustrated schematically by arrow "C").

Figure 6:
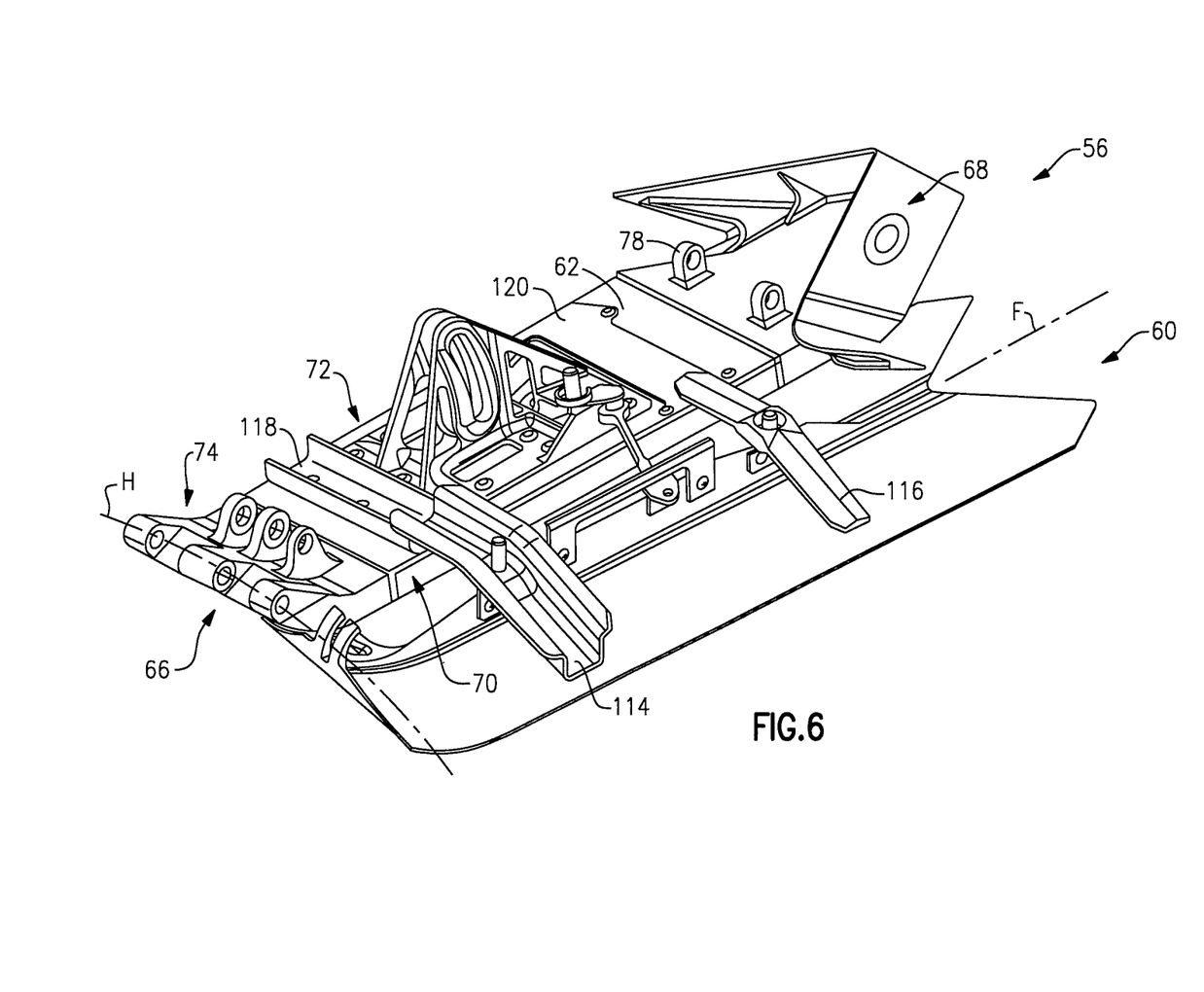
FIG. 6 is an outer perspective view of a portion of the divergent section from a cold side.

With reference to FIG. 6, the divergent section 46 includes alternate divergent flap seals 60 and divergent flaps 56—illustrated from a side opposite the hot-side which is directly exposed to engine exhaust gases of the core primary airflow C. It should be understood that the divergent section 46 portion as illustrated herein is for descriptive purposes only and applies to each adjacent flap 56 and flap seal 60 defined about the circumference of the nozzle system 34. Each divergent flap 56 includes a divergent flap hot-side panel 62 and a coldside panel 64. The panels 62, 64 may form an at least partially hollow interior to receive the secondary airflow "S" there through. Each divergent flap 56 may be described as having a length between a forward section 66 and an aft section 68, and a width between a first longitudinal side 70 and a second longitudinal side 72. The forward section 66 of each divergent flap 56 includes joint structure that forms a portion of the joint 58 along the hinge axis H.

The aft section 68 of each divergent flap 56 may include a plow tip 74. It should be understood that separate or integral tip sections of various shapes and configurations will benefit here from. The plow tip 74 may be chiseled and includes a hinge point 76 for attachment of an external flap 78 (FIGS. 2 and 4).

Figure 7:
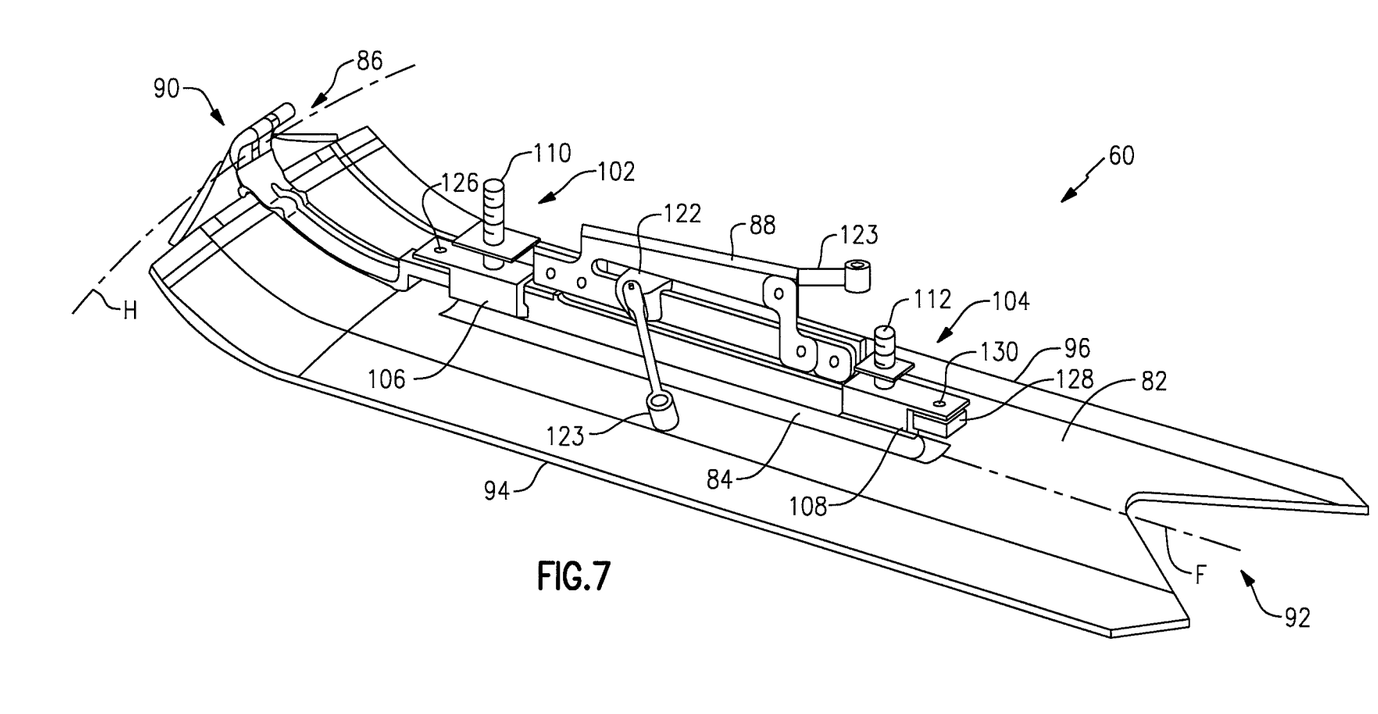
FIG. 7 is a perspective view of a divergent flap seal from a cold side according to one non-limiting embodiment.

With reference to FIG. 7, each divergent flap seal 60 includes a flap seal body 82, a spine 84, a flap seal joint 86 and a flap seal position guide 88. The flap seal joint 86 forms a portion of the joint 58 about hinge axis H that surrounds the engine centerline "A". Each flap seal body 82 may be described as having a length between a forward section 90 and an aft section 92, and a width between a first longitudinal side 94 and a second longitudinal side 96. The flap seal body 82 is a relatively planar member manufactured of a non-metallic material such as a SN240 monolithic ceramic. The aft section 92 may be of a chevron shape.

The spine 84 extends from the flap seal body 82 of each divergent flap seal 60 along a central axis F between the forward section 90 and the aft section 92 transverse to the hinge axis H and parallel to the first longitudinal side 94 and the second longitudinal side 96. The spine 84 defines a backbone that has a flared dovetail shape in cross-section with a head 98 and a rib 100. The head 98 is thicker than the rib 100.

Figure 8:
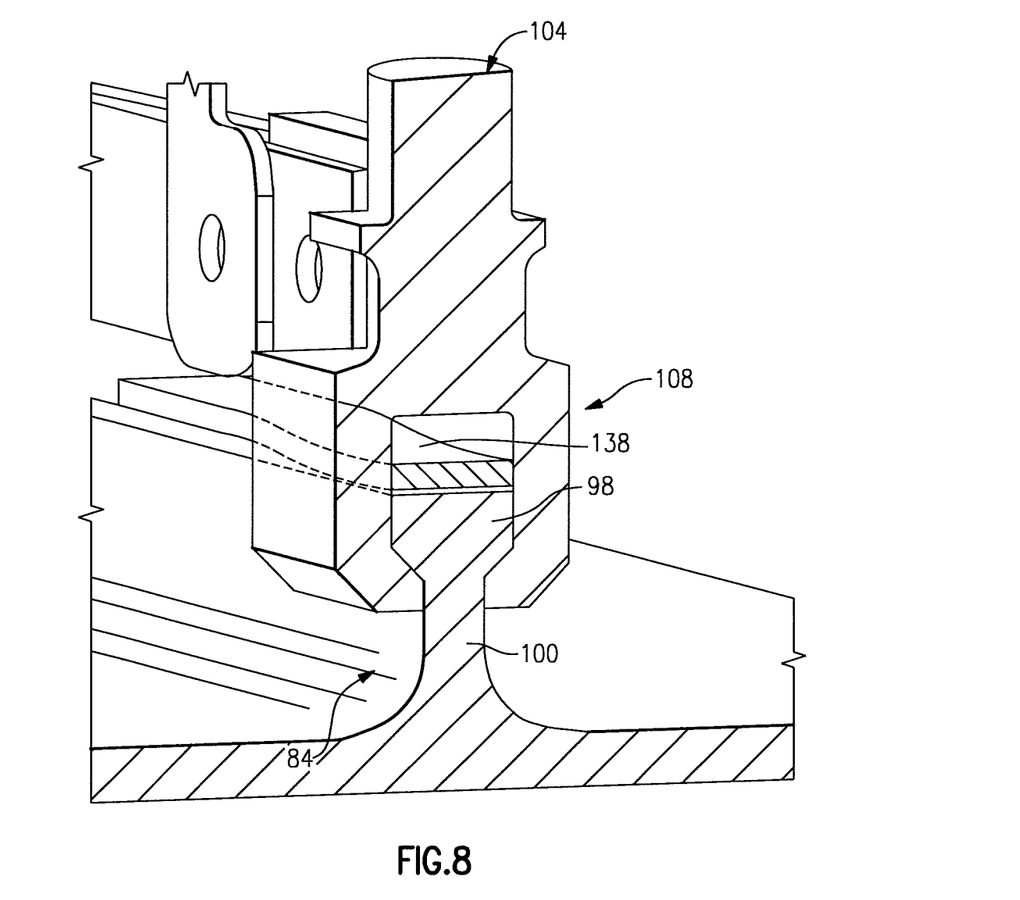
FIG. 8 is a lateral sectional view of a dovetail interface of the divergent flap seal of FIG. 7.

A forward mount 102 and an aft mount 104 interfaces with the spine 84. The forward mount 102 and the aft mount 104 each includes a respective tail 106, 108 that receives the head 98 of the spine 84. That is, the spine 84 forms a male dove tail geometry and the respective tail 106, 108 form a female dove tail geometry to radially lock onto the spine 84 (FIG. 8).

The forward mount 102 and the aft mount 104 each includes a respective threaded post 110, 112 to support a respective bridge clamp 114, 116 that provide a slidable interface with a respective bridge support 118, 120 of the adjacent divergent flap 56 (FIG. 6). That is, the bridge clamps 114, 116 are transverse to the central axis F to bridge the overlap interface with the adjacent divergent flaps 56 that flank each divergent flap seal 60 to at least partially radially support each divergent flap seal 60.

The flap seal position guide 88 is mounted between the forward mount 102 and the aft mount 136. The flap seal position guide 88 supports a slider 122 with link arms 123 that attach to the respective adjacent divergent flap 56 to further guide movement of the divergent flap seal 60 (FIG. 6). As the flap seal position guide 88, the forward mount 102 and the aft mount 104 are manufactured of metal alloys, the components may be readily fastened together with fasteners 124 such as rivets or bolts (FIG. 9).

The forward mount 102 is also attached to the flap seal joint 86 with a fastener 126 such as rivets or bolts. The forward mount 102 is thereby axially fixed relative to the spine 84 by the flap seal joint 86. The aft mount 104 is attached to an axial stop 128 with a fastener 130 such as rivets or bolts. The aft mount 104 is attached to the forward mount 102 through the flap seal position guide 88 such that the axial stop 128 provides aftward axial retention of the divergent flap seal 60. That is, the axial stop 128 interfaces with an edge 132 of the spine 84 to 15 prevent the flap seal body 82 from axially sliding out of the mounts 102, 104 (FIG. 9). That is, the ceramic divergent flap seal 60 is effectively retained to the metal alloy mounts 102, 104 yet differential thermal expansion is readily accommodated without thru-fasteners.

In operation, as the metal alloy of the mounts 102, 104 thermally expand from engine operation, the tail 106, 108 may expand in any direction away from the ceramic material spine 84 to provide a thermally free design. The spine 84 is also loaded in compression that is advantageous in monolithic ceramic materials. As there is a relatively large shear area provided by the spine 84, the shear stress is relatively low which is also advantageous in monolithic ceramic materials. The dovetail interface also removes the need for thru-fasteners which need otherwise penetrate the monolithic ceramic materials.

Figure 9:
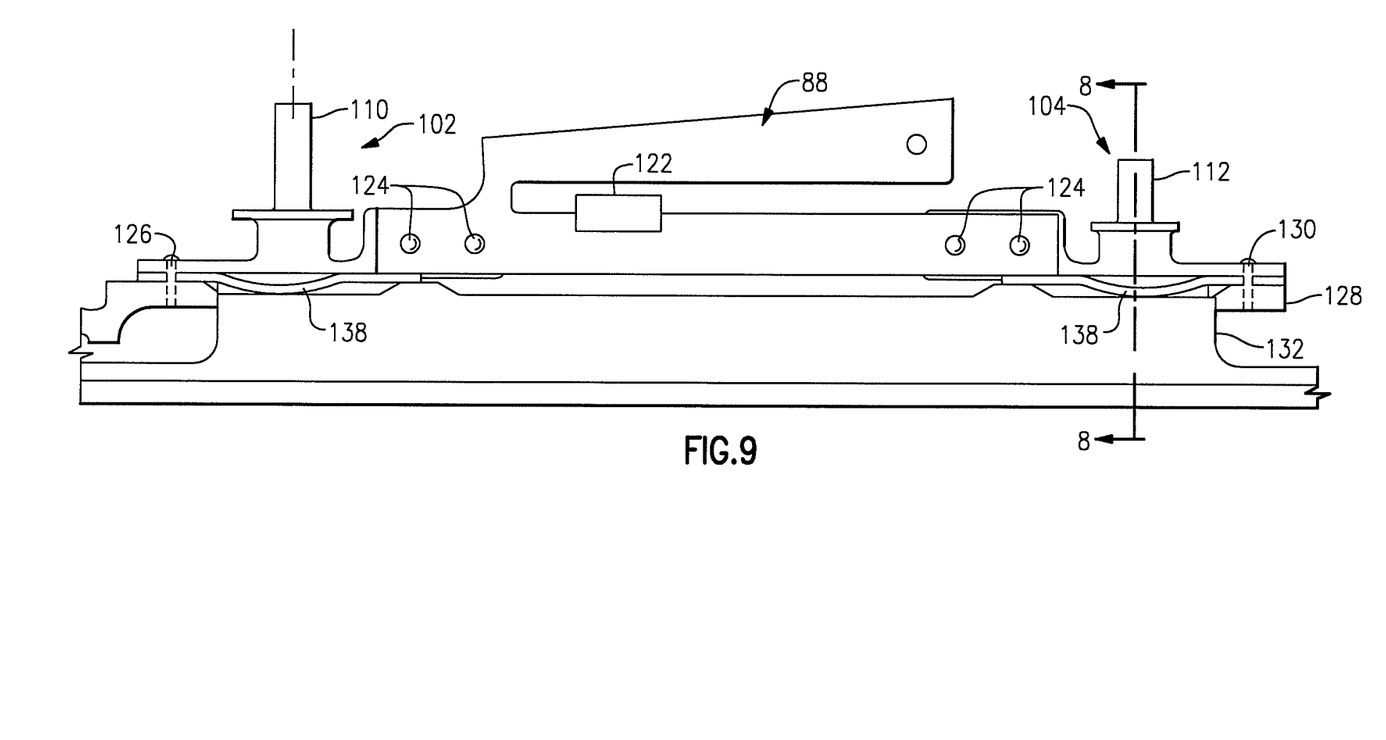
FIG. 9 is a longitudinal sectional view of the divergent flap seal of FIG. 7.

With reference to FIG. 9, a resilient member 138 (also shown in FIG. 8) may alternatively or additionally be utilized to provide a frictional damper at the dovetail interface. The resilient member 138 may be a leaf spring, resilient material other bias member. The resilient member 138 may be manufactured of a flat piece of metal alloy that is formed in a partially arcuate shape. When the resilient member 138 is deformed, a preload is provided between the spine 84 and the respective tail 106, 108 of the forward mount 102 and the aft mount 104.

The resilient member 138 maintains surface contact between the spine 84 and the respective tail 106, 108 as, under some operational conditions, the ceramic divergent flap seal 60 divergent seal can experience a zero (0) external load in, for example, an under expanded condition. The resilient member 138 provides a specified output load within a given space between the spine 84 and the respective tail 106, 108.

Figure 10:
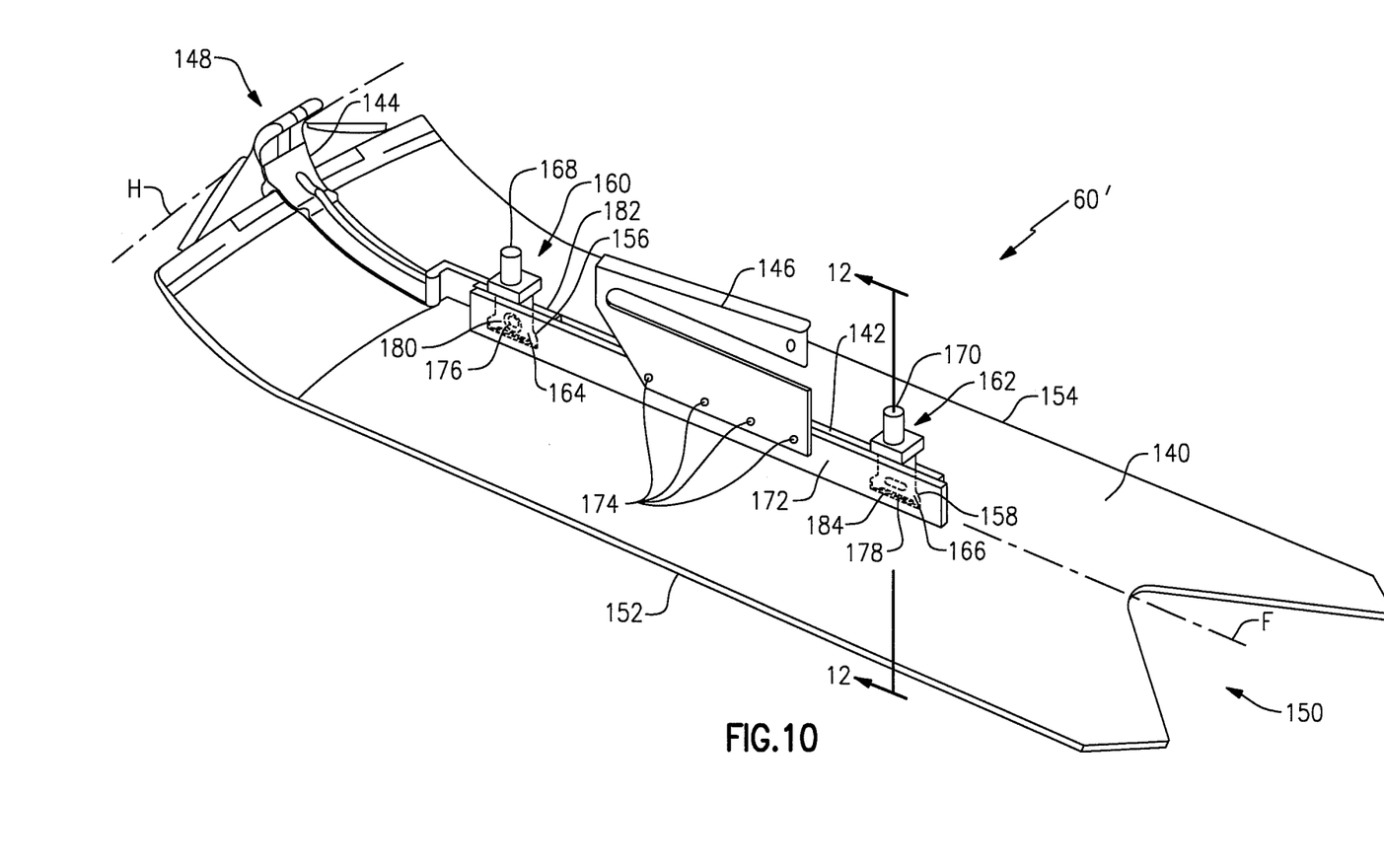
FIG. 10 is a perspective view of a divergent flap seal from a cold side according to another non-limiting embodiment.

With reference to FIG. 10, each divergent flap seal 60' according to another disclosed non-limiting embodiment includes a flap seal body 140, a spine 142, a flap seal joint 144 and a flap seal position guide 146. The flap seal joint 144 forms a portion of the joint 58 about hinge axis H that surrounds the engine centerline A. Each flap seal body 140 may be described as having a length between a forward section 148 and an aft section 150 with a width between a first longitudinal side 152 and a second longitudinal side 154. The flap seal body 140 is a relatively planar member manufactured of a non-metallic material such as a SN240 monolithic ceramic. The aft section 150 may be of a chevron shape.

The spine 142 extends from the flap seal body 140 of each divergent flap seal 60 along a central axis F between the forward section 148 and the aft section 150 transverse to the hinge axis H and parallel to the first longitudinal side 152 and the second longitudinal side 154. The spine 142 defines a backbone that has a forward dovetail socket 156 and an aft dovetail socket 158.

A forward mount 160 and an aft mount 162 (also shown in FIGS. 11 and 12) interfaces with the spine 142 at the respective forward and aft dovetail sockets 156, 158. The forward mount 160 and the aft mount 162 each includes a respective tail 164, 166 that is received within the respective forward and aft dovetail sockets 156, 158.

The forward mount 160 and the aft mount 162 each includes a respective threaded post 168, 170 to support a respective bridge clamp 114, 116 that provide a slidable interface with a respective bridge support 118, 120 of the adjacent divergent flap 56 (FIG. 6). That is, the bridge clamps 114, 116 are transverse to the central axis F to bridge the overlap interface with the adjacent divergent flaps 56 that flank each divergent flap seal 60 to at least partially radially support each divergent flap seal 60.

The flap seal position guide 146 is attached to a clamp plate 172 that is mounted between the forward mount 160 and the aft mount 136. The flap seal position guide 146 supports a slider 122 with link arms 123 (FIG. 6) that attach to the respective adjacent divergent flap 56 to further guide movement of the divergent flap seal 60. As the flap seal position guide 146 and the clamp plate 172 are manufactured of metal alloys, the components may be readily fastened together with fasteners 174 such as rivets or bolts.

The clamp plate 172 includes a forward circular aperture 176 and an aft slot aperture 178. The forward circular aperture 176 and the aft slot aperture 178 are aligned with the respective forward and aft mount 160, 162.

The forward circular aperture 176 receives a fastener 180 such as a rivet or 5 bolt that extends through the clamp plate 172, the forward mount 160 and the flap seal joint 144. The tail 164 of the forward mount 160 is thereby sandwiched within the forward dovetail socket 156 between the clamp plate 172 and a back plate 182 of the forward mount 160.

The aft slot aperture 178 receives a fastener 184 such as a rivet or bolt that extends through the clamp plate 172 and the aft mount 162. The tail 166 of the aft mount 162 is 10 thereby sandwiched within the aft dovetail sockets 158 between the clamp plate 172 and a back plate 186 of the aft mount 162. The aft slot aperture 178 permits axial thermal expansion and contraction of the flap seal position guide 146 is attached to a clamp plate 172. That is, the ceramic divergent flap seal 60 is effectively retained to the metal alloy mounts 160, 162 yet differential thermal expansion is readily accommodated without thru-fasteners.

In operation, as the metal alloy mounts 160, 162 thermally expand from engine operation, the aft slot aperture 178 provides a thermally free design. The spine 142 is also loaded in compression that is advantageous in monolithic ceramic materials. The dovetail interface also removes the need for thru-fasteners which need otherwise penetrate the monolithic ceramic materials. A preload mechanism may alternatively or additionally be utilized to provide a frictional damper at the dovetail interface.

Figure 11:
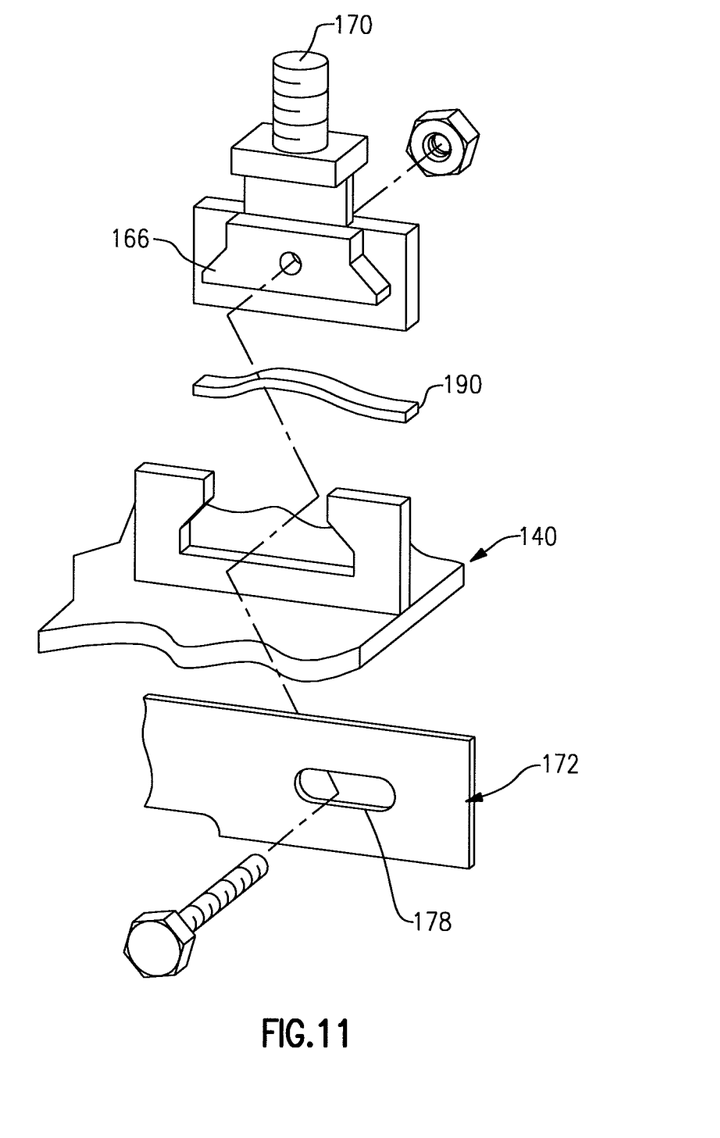
FIG. 11 is a longitudinal sectional view of a dovetail interface of the divergent flap seal of FIG. 10.

With reference to FIG. 11, a resilient member 190 (also shown in FIG. 12) may alternatively or additionally be utilized to provide a frictional damper at the dovetail interface.

Figure 12:
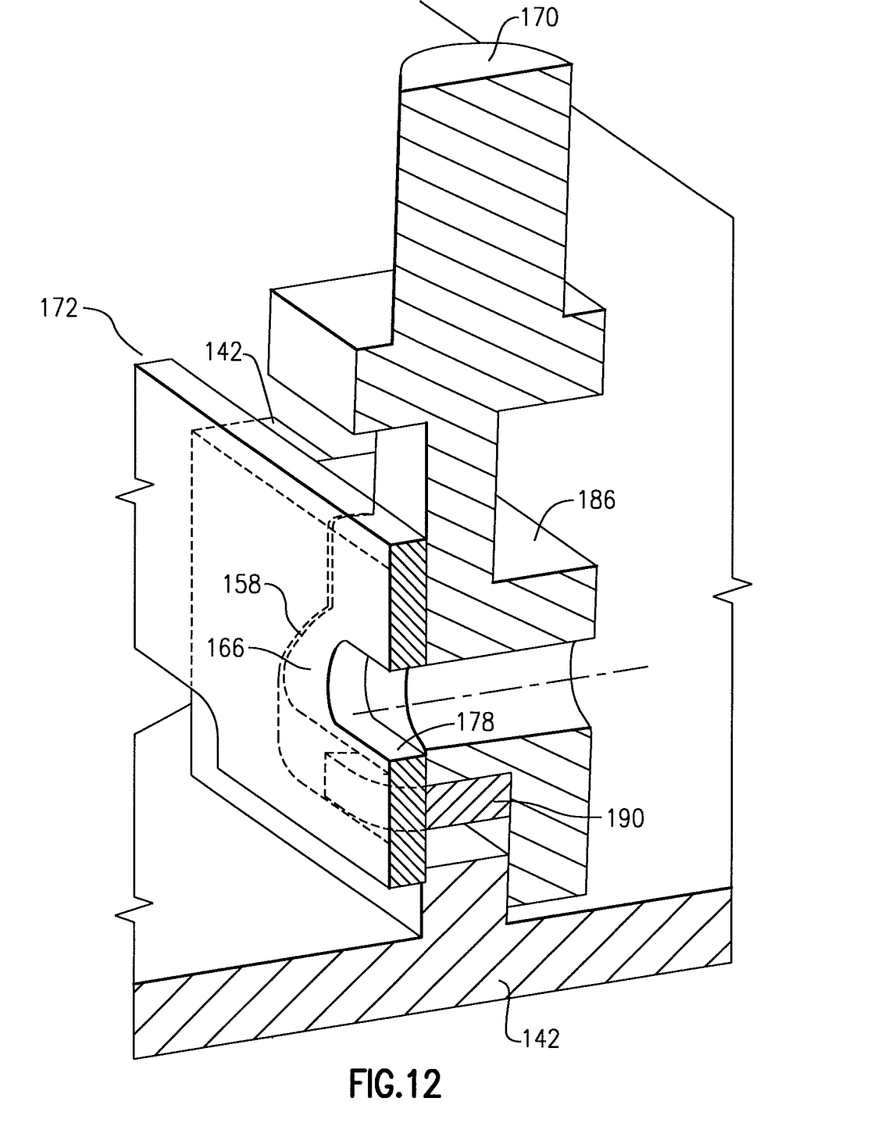
FIG. 12 is a lateral sectional view of the divergent flap seal of FIG. 10.

The resilient member 190 is located between the respective tail 164, 166 of the forward mount 160 and an aft mount 162 and the aft dovetail sockets 156, 158. The resilient member 190 is also sandwiched and thereby retained within the aft dovetail sockets 158 between the clamp plate 172 and a back plate 186 of the aft mount 162. When the resilient member 190 5 is deformed, a preload is provided.

It should be understood that like reference numerals identify corresponding or similar elements throughout the several drawings. It should also be understood that although a particular component arrangement is disclosed in the illustrated embodiment, other arrangements will benefit here from.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A divergent flap seal comprising:
    a flap seal body with a spine, said flap seal body manufactured of a non-metallic material;
    a mount engaged with said spine at a dovetail interface; and
    a resilient member at said dovetail interface.

2. The divergent flap seal as recited in claim 1, wherein said mount is manufactured of a metallic alloy.

3. The divergent flap seal as recited in claim 1, wherein said flap seal body is manufactured of a monolithic ceramic material.

4. The divergent flap seal as recited in claim 3, wherein said monolithic ceramic material is a SN240 monolithic ceramic.

5. The divergent flap seal as recited in claim 1, wherein said resilient member is a leaf spring.

6. A divergent flap seal comprising:
    a flap seal body with a spine, said flap seal body manufactured of a non-metallic material;
    a forward mount engaged with said spine at a forward dovetail interface;
    a first resilient member at said forward dovetail interface;

an aft mount engaged with said spine at an aft dovetail interface; and a second resilient member at said aft dovetail interface.

7. The divergent flap seal as recited in claim 6, wherein said first resilient member and said second resilient member are located between said spine and a tail of said respective forward mount and aft mount.

8. The divergent flap seal as recited in claim 7, wherein said spine has a male dove tail geometry and said tail of said respective forward mount and aft mount has a female dove tail geometry to radially lock onto the dovetail spine.

9. The divergent flap seal as recited in claim 8, wherein said spine forms a flared pin in cross-section.

10. The divergent flap seal as recited in claim 9, wherein said first resilient member and said second resilient member is a leaf spring.

11. The divergent flap seal as recited in claim 6, further comprising a clamp plate mounted to said forward mount and said aft mount to sandwich said first resilient member and said second resilient member at least partially within said spine.

12. The divergent flap seal as recited in claim 11, wherein said first resilient member and said second resilient member are at least partially within a forward dovetail socket and an aft dovetail socket in said spine.

13. The divergent flap seal as recited in claim 12, wherein said first resilient member and said second resilient member is a leaf spring.

* * * * *